US00RE34216E

United States Patent [19]

Itakura et al.

[11] E Patent Number: Re. 34,216

[45] Reissued Date of Patent: Apr. 13, 1993

[54] METHOD OF AND APPARATUS FOR CONTROLLING ENGINE REVOLUTION SPEED

[75] Inventors: Tomiya Itakura; Hiroshi Kamifuji, both of Katsuta, Japan

[73] Assignees: Hitachi, Ltd., Tokyo; Hitachi Automotive Engineering Co., Ltd., Katsuto, both of Japan

[21] Appl. No.: 666,182

[22] Filed: Mar. 7, 1991

Related U.S. Patent Documents

Reissue of:

[64] Patent No.: 4,879,982
Issued: Nov. 14, 1989
Appl. No.: 234,936
Filed: Aug. 22, 1988

[30] Foreign Application Priority Data

Aug. 28, 1987 [JP] Japan ..... 62-213106

[51] Int. Cl.[5] ..... F02D 41/08

[52] U.S. Cl. ..... 123/339; 123/588

[58] Field of Search ..... 123/339, 585, 586, 587, 123/588; 74/859, 860; 364/431.07

[56] References Cited

U.S. PATENT DOCUMENTS 4,392,468 7/1983 Kobashi et al. ..... 123/339
4,401,073 8/1983 Furuhashi ..... 123/339
4,402,289 9/1983 Ikeura ..... 123/339
4,484,552 11/1984 Kobayashi et al. ..... 123/339
4,484,553 11/1984 Kobayashi et al. ..... 123/586 X
4,513,710 4/1985 Kobayashi et al. ..... 123/339
4,545,348 10/1985 Ikeura ..... 123/339
4,617,890 10/1986 Kobayashi et al. ..... 123/339
4,721,083 1/1988 Hosaka ..... 123/339
4,760,823 8/1988 Yasuoka et al. ..... 123/339
4,787,044 11/1988 Nagata et al. ..... 123/339
4,819,596 4/1989 Yasuoka et al. ..... 123/339

FOREIGN PATENT DOCUMENTS 0040886 11/1974 Japan .
0124042 8/1982 Japan .

*Primary Examiner*—Willis R. Wolfe
*Attorney, Agent, or Firm*—Antonelli, Terry, Stout & Kraus

[57] ABSTRACT

A method of and an apparatus for controlling the revolution speed of an engine, suitable for use in an automobile having an automatic transmission. Flow rate of auxiliary intake air by-passing a throttle valve is controlled by an auxiliary air control valve, the opening period of which is incremented in response to a signal which represents the state of the automatic transmission shifted from neutral range to a power range so as to avoid any reduction in the engine speed or the engine stall. The valve open time is controlled as a function of the engine cooling water temperature.

8 Claims, 4 Drawing Sheets

Duty = Ton/T x 100(%)

METHOD OF AND APPARATUS FOR CONTROLLING ENGINE REVOLUTION SPEED

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a method of and an apparatus for controlling the revolution speed of an automotive engine having an automatic transmission and, more particularly, to a method of and an apparatus for controlling the revolution speed of such an engine in accordance with the condition of the engine when the load level is changed.

2. Description of the Prior Art

A modern system for executing the engine speed control of the type described above is disclosed in, for example, Japanese Patent Examined Publication No. 49-40886. In this system, actual engine speed is compared with a standard idle speed and an electrical valve disposed in a pipe by-passing a throttle valve is suitably opened and closed in accordance with the result of the comparison, thereby maintaining a constant engine speed. Another method for controlling idle speed of an engine disclosed in Japanese Patent Unexamined Publication No. 57-124042 employs means for computing the upper and lower limit values of engine speed when neutral state or drive state is selected in an automatic transmission, and these upper and lower limits of the engine speed are used as a function of the cooling water temperature in the control of the idle speed of the engine.

These conventional arts, however, do not take into consideration about the influence of load level change from no-load idle range (referred to as N range) to driving range (referred to as D range or R range) in an automobile having an automatic transmission. Operation of automatic transmission often encounters a problem in that the engine revolution speed is lowered due to a drastic change in the load particularly when shifting from N to D or R range, often resulting in an engine stall in the worst case. In other words, the gain of the feedback loop interconnecting the engine and the automatic transmission could not respond to the change in the load level.

SUMMARY OF THE INVENTION

Accordingly, an object of the present invention is to provide a method of and an apparatus for controlling the engine revolution speed, which is improved in such a way as to avoid any excessive reduction in the engine speed or engine stall when an automatic transmission is manipulated from N range to D or R range.

To this end, according to the present invention, there is provided a method of controlling engine speed in which the state of an auxiliary air valve, which determines the engine speed, is controlled in such a manner that the period of opening of this valve is increased in response to a D-range signal which is produced when the automatic transmission is operated from N to D range.

The increment of the opening period of the auxiliary air valve is controlled in accordance with a function of the engine cooling water temperature because the air flow rate demanded by the engine varies according to the state of the engine which is represented by the temperature of the engine cooling water.

Thus, according to one aspect of the present invention, there is provided a method of controlling operation speed of an engine for use in an automobile having an automatic transmission through which driving power is transmitted from an engine to driving wheels, the method employing an engine speed controlling apparatus which includes, at least, an auxiliary air control valve for supplying auxiliary air by-passing a throttle valve, electromagnetic means for actuating the auxiliary air control valve, a sensor for detecting the revolution speed of the engine, and control means for controlling the flow rate of the auxiliary air through the auxiliary air control valve by varying the Duty of the electromagnetic means in accordance with a signal from the sensor, the method comprising the steps of: effecting an increment of the Duty of the electromagnetic means after a time Tdly upon receipt of a signal representing that the state of the transmission has been changed from the neutral state to a power transmitting state; maintaining the incremented state of Duty for a period $T_{ND}$; reducing the Duty at rate $K_{ND}$; and delivering the delay time Tdly, period $T_{ND}$ and the rate $K_{ND}$ as functions of the cooling water temperature on the basis of the temperature of the engine cooling water.

According to another aspect of the present invention, there is provided an apparatus for controlling operation speed of an engine, for use in an automobile having an automatic transmission through which driving power is transmitted from an engine to driving wheels, the apparatus having, at least, an auxiliary air control valve for supplying auxiliary air by-passing a throttle valve, electromagnetic means for actuating the auxiliary air control valve, a sensor for detecting the speed of the engine, and auxiliary air flow rate control means for controlling the flow rate of the auxiliary air through the auxiliary air control valve by varying the Duty of the electromagnetic means in accordance with a signal from the sensor, the apparatus comprising: shift detection means for detecting the shifting of operation range in the automatic transmission from neutral range to a power transmitting range; temperature detecting means for detecting the engine cooling water temperature; and controlling means for effecting an increment of the Duty of the electromagnetic means after a delay Tdly upon receipt of a signal from the shift detection means indicative of the shift from the neutral range to the power transmitting range; the controlling means including means for maintaining the incremented Duty for a predetermined period $T_{ND}$ and reducing the Duty at a reducing rate $K_{ND}$, and computing means for computing the values of the delay time Tdly, period $T_{ND}$ and the reduction rate $K_{ND}$ on the basis of the temperature of engine cooling water, in accordance with a predetermined program.

In general, when the automatic transmission is switched to a power-transmitting state to drastically load the engine, the engine demands an increase in the rate of supply of the air. The increment of the air demanded by the engine varies according to the engine cooling water temperature. In the method of the present invention, however, the values of the factors Tdly, $T_{ND}$ and $K_{ND}$ are adequately and automatically determined in accordance with the engine cooling water temperature, so that the automobile can start smoothly, certainly and safely without any risk of overloading the engine. In the engine speed control according to the invention, a feedback control of the engine revolution speed is executed to in accordance with the state of engine (the engine cooling water temperature) so as to maintain a constant command engine revolution speed. This control is practically executed by delivering an N-D shift signal, practically a signal corresponding to ON-OFF state of the neutral switch to a computing unit serving as a microprocessor, and computing and determining the optimum valve-open time in accordance with the engine cooling water temperature.

When the air flow rate demanded by the engine is increased due to application of load in the transient period during shifting from N range to D range or to R range, the control Duty for the auxiliary air control valve is temporarily prolonged so as to increase the rate of air supply so that good driveability without any substantial drop of engine speed or engine stall can be obtained during shifting from the N range to D or to R range.

These and other objects, features and advantages of the invention will become clear from the following description of the preferred embodiments when the same is read in conjunction with the accompanying drawings.

DESCRIPTION OF THE PREFERRED EMBODIMENTS

Figure 1:
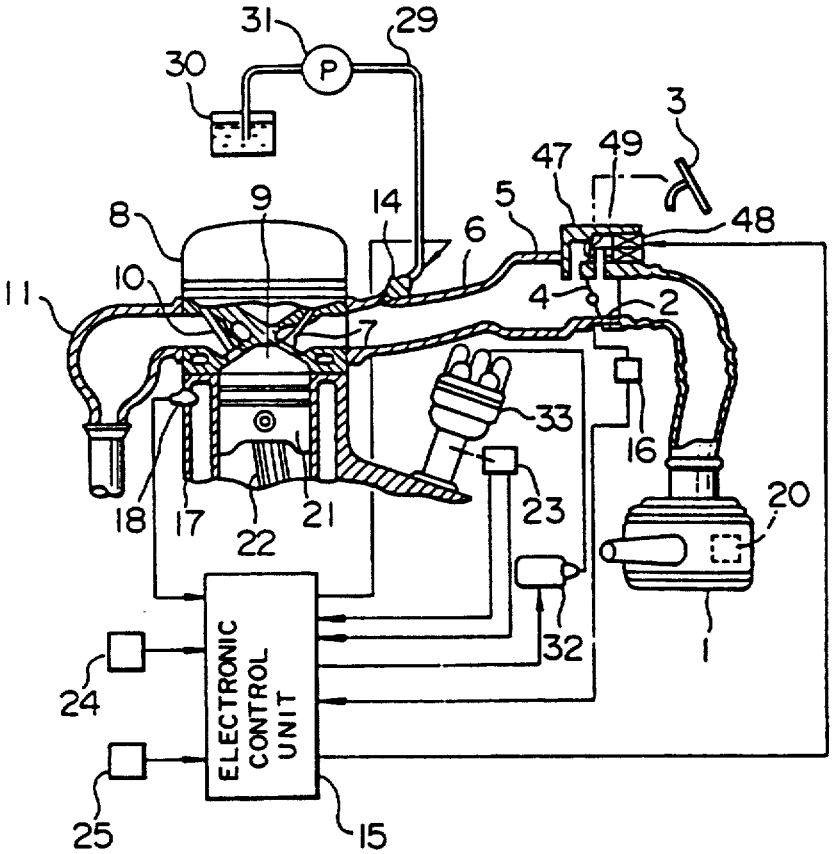
FIG. 1 is an illustration of an engine revolution speed control apparatus in accordance with an embodiment of the present invention.

A preferred embodiment of the present invention will be described hereinunder with reference to the accompanying drawings. Air sucked through the air cleaner 1 is introduced into the combustion chamber of the engine 8 through a surge tank 5, an intake manifold 6 and an intake valve 7. The flow rate of this air is controlled by a throttle valve 4 which is disposed in a throttle body 2 and which is operatively connected to an accelerator pedal 3 adapted to be operated by the driver. As a result of combustion of fuel in the combustion chamber together with the air, combustion gas is generated and emitted to the atmosphere through an exhaust pipe 10 and an exhaust manifold 11. A fuel injector 14 corresponding to each combustion chamber 9 is provided in each branch of the intake manifold 6. The arrangement may be such that a single fuel injection valve 14 is disposed upstream of the throttle vlave 4. The throttle body 2 also has an auxiliary air control valve 47 mounted to there and having an air passage which bypasses the throttle valve 4. The illustrated arrangement is only illustrative and may be modified such that the auxiliary air control valve 47 is mounted separately from the throttle body 2 and is connected to the intake passage through a suitable conduit.

Figure 3:
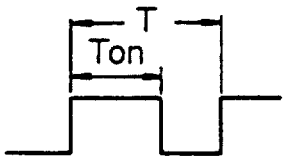
FIG. 3 is an illustration of duty pulse.

A pulse signal of a period T (see FIG. 3) is supplied to the solenoid valve 48, and the period $T_{ON}$ is varied so as to cause a displacement of the valve 49 of the auxiliary air control valve 47 thereby to change the flow rate of air by-passing the throttle valve 4. Referring to FIG. 3, the ratio of the period $T_{ON}$ to the period T of the pulse signal in terms of percents is referred to as "Duty" hereinunder. Thus, the term "Duty" in this specification is used to mean the rate of the time in which the power supply is maintained.

An electronic control unit 15 has a microprocessor serving as a computing unit, a read-only memory (ROM), a random access memory (RAM) and an input-/output device (I/O port) etc. The electronic control unit 15 is designed to operate in response to various signals derived from various sensors on the engine including an oxygen sensor 19 mounted on the exhaust branch pipe 11 and adapted for detecting the oxygen concentration in the exhaust gas, a throttle sensor 16 for sensing the angle of rotation of the throttle valve 4, a water-temperature sensor 18 mounted on the water jacket 17, an intake air temperature sensor 20 for sensing the intake air temperature, and a neutral switch 50 (mentioned later in connection with FIG. 2) for detecting the state of the transmission, as well as signals from various devices such as an ignition switch 24, a starter switch 25 etc.

The rotary angle sensor 23 includes a position detector 26 adapted for producing a pulse per every two rotations of the crankshaft (not shown) and an angle detector 27 capable of outputting a pulse for each predetermined crank angle, e.g., 1°.

A fuel pump 31 boosts the fuel from a fuel tank 30 to the fuel injection valve 14 through a fuel supply passage 29.

The electronic control unit 15 computes the fuel injection rate and the fuel injection time in response to various input signals and delivers a fuel injection pulse to the fuel injection valve 14. At the same time, the electronic control unit 15 computes the opening time of the auxiliary air control valve 47 and delivers the Duty to the solenoid valve 48. In addition, the electronic control unit 15 computes the ignition timing and delivers a current to the ignition coil 32. The secondary current of the ignition coil 32 is delivered to the distributor 33 so as to be distributed to the ignition plugs (not shown).

Figure 2:
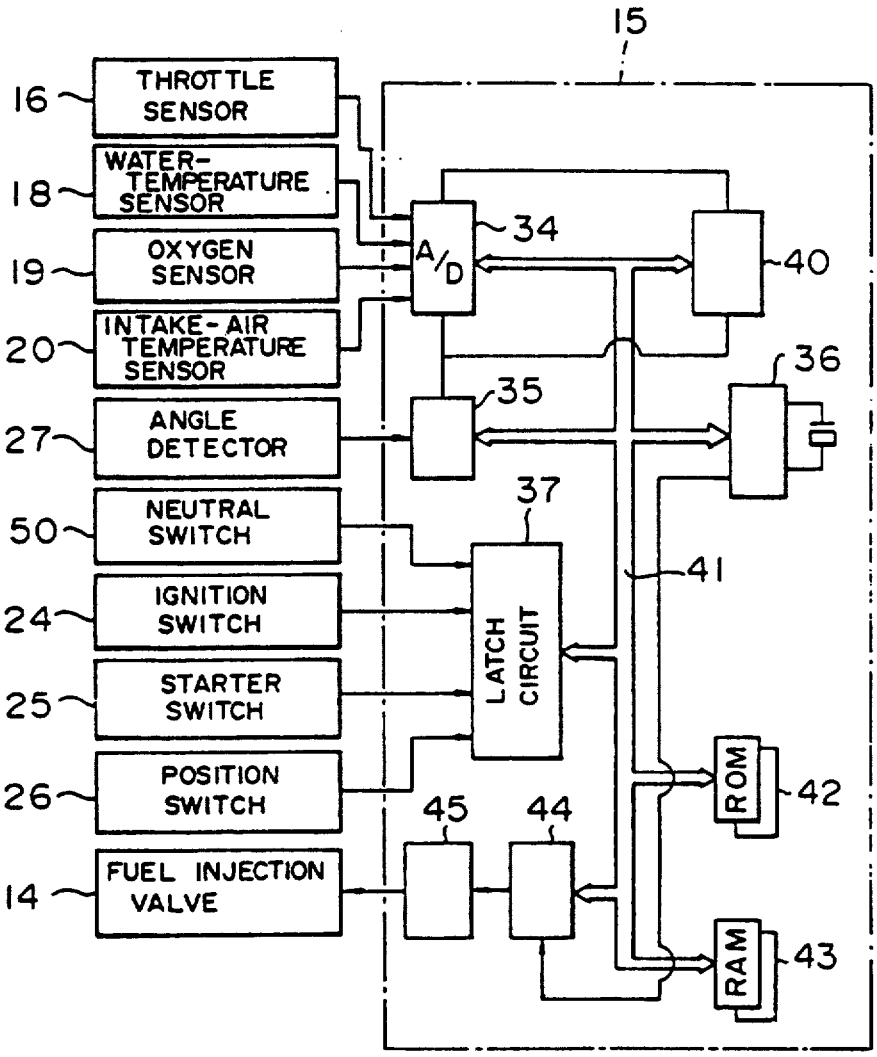
FIG. 2 is a block diagram of an electronic control unit.

FIG. 2 illustrates a block diagram showing the construction of the electronic control unit 15. This control unit 15 has a plurality of sensors including the oxygen sensor 19, water-temperature sensor 18, intake-air temperature sensor 20 and a throttle sensor 16, the outputs of which are delivered to the A/D converter 34 so as to be converted into a digital signal.

A revolution speed detection circuit 35 is designed to count the number of pulses input from the angle detector 27 within a predetermined period of time and produces an output proportional to the engine revolution speed.

A latch circuit 37 is adapted for temporarily storing the outputs from the neutral switch 50, an ignition switch 24, starter switch 25 and the position detector 26 of the revolution angle sensor 23 (see FIG. 1).

A microprocessor 40 is connected through a BUS line 41 to a ROM 42, a RAM 43 and other blocks 34, 35, 37 and computed the Duty to be supplied to the auxiliary air control valve 47 (see FIG. 1), fuel injection rate, and so on in accordance with a predetermined program.

The flow rate of the air flowing through the intake system is measured by arithmetically processing the air flow rate in accordance with the intake air pressure in the intake air pipe, or through computing the air flow rate in accordance with an air flow meter of flap type or hot-wire type air flow meter disposed in the intake air passage.

The duty supplied to the solenoid valve 48 (see FIG. 1) of the auxiliary air control valve 47 is given by the following formula (1).

$$\text{Duty} = D_{BG} \times K + D_{FB} \quad (1)$$

Figure 4:
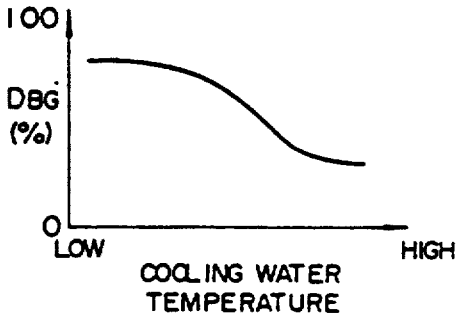
FIG. 4 is a diagram showing the operation characteriatic of the auxiliary air control valve.

In this formula, $D_{BG}$ represents a basic duty which is determined in accordance with the engine cooling water temperature and used for determining the command engine revolution speed. The value of $D_{BG}$ is set as shown in FIG. 4 and is stored in the ROM in the form of a water-temperature table. A symbol K represents a correction coefficient corresponding to changes in factors such as the intake air temperature, voltage of the battery and so forth. A symbol $D_{FB}$ represents the feedback component which is incremented or decremented in accordance with the offset of the actual engine revolution speed from the command engine revolution speed.

In an automobile having an automatic transmission, the reactional torque is transmitted from the driving wheels to the engine through the automatic transmission when the transmission is operated from N range to the D range. In consequence, the air flow rate demanded by the engine is increased as compared with that in the N range. The difference between these cases in the intake air flow rate demanded by the engine actually appears as a reduction in the engine speed when the transmission is shifted from the N range to the D range. The reduction in the engine revolution speed is corrected by $D_{FB}$ as the offset between the command engine speed and the actual engine speed. It is, however, difficult to maintain the command engine speed due to insufficient resolution of the engine speed control.

Figure 5:
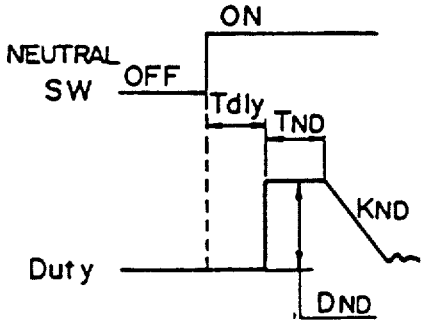
FIG. 5 is an illustration of a logic of the embodiment shown in FIG. 1.

According to the invention, therefore, a control is conducted in a manner which will be described hereinunder with reference to FIG. 5. Namely, when the transmission which has been set in N range is manipulated to select the D range, the signal Duty is incremented in response to the signal from the neutral switch 50 by an amount $D_{ND}$ in a stepped manner at a moment which is Tdly after the delivery of the signal and the thus raised level of the Duty is maintained for a period $T_{ND}$. The signal Duty is then decreased at a rate of $K_{ND}$. The delay time Tdly has a significance particularly when the engine temperature is still low. Namely, when the engine temperature is still low, a certain time lag inevitably occurs in the commencement of transmission of the power due to hydraulic characteristic of the transmission, even when the neutral switch 50 is turned on in response to shifting from the N range to the D range. This delay time Tdly is set so as to prevent excessive correcting in that time lag. As a result of this control, it becomes possible to adequately cope with the momentary change in the intake air flow rate demanded by the engine in the transient period of the shifting from the N range to the D range, whereby the shifting from the N range to the D range or from the N range to the D range is completed smoothly without causing any reduction in the engine speed.

Figure 6:
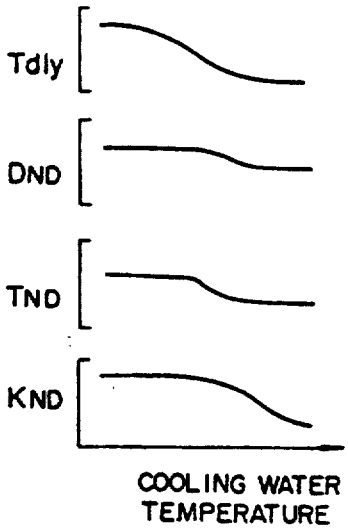
FIG. 6 is a diagram of control constants of the embodiment shown in FIG. 1.

The values of the constants such as Tdly, $D_{ND}$, $T_{ND}$ and $K_{ND}$ vary according to the state of the engine, so that a higher precision of the engine revolution speed control can be attained by determining these factors as functions of the engine cooling water temperature as shown in FIG. 6.

The engine speed control according to the invention can be realized by a process which will be explained hereinunder with reference to FIG. 7. The program shown in FIG. 7 is an administration program which is adapted to be driven at a predetermined constant period, e.g., 10 msec.

Figure 7:
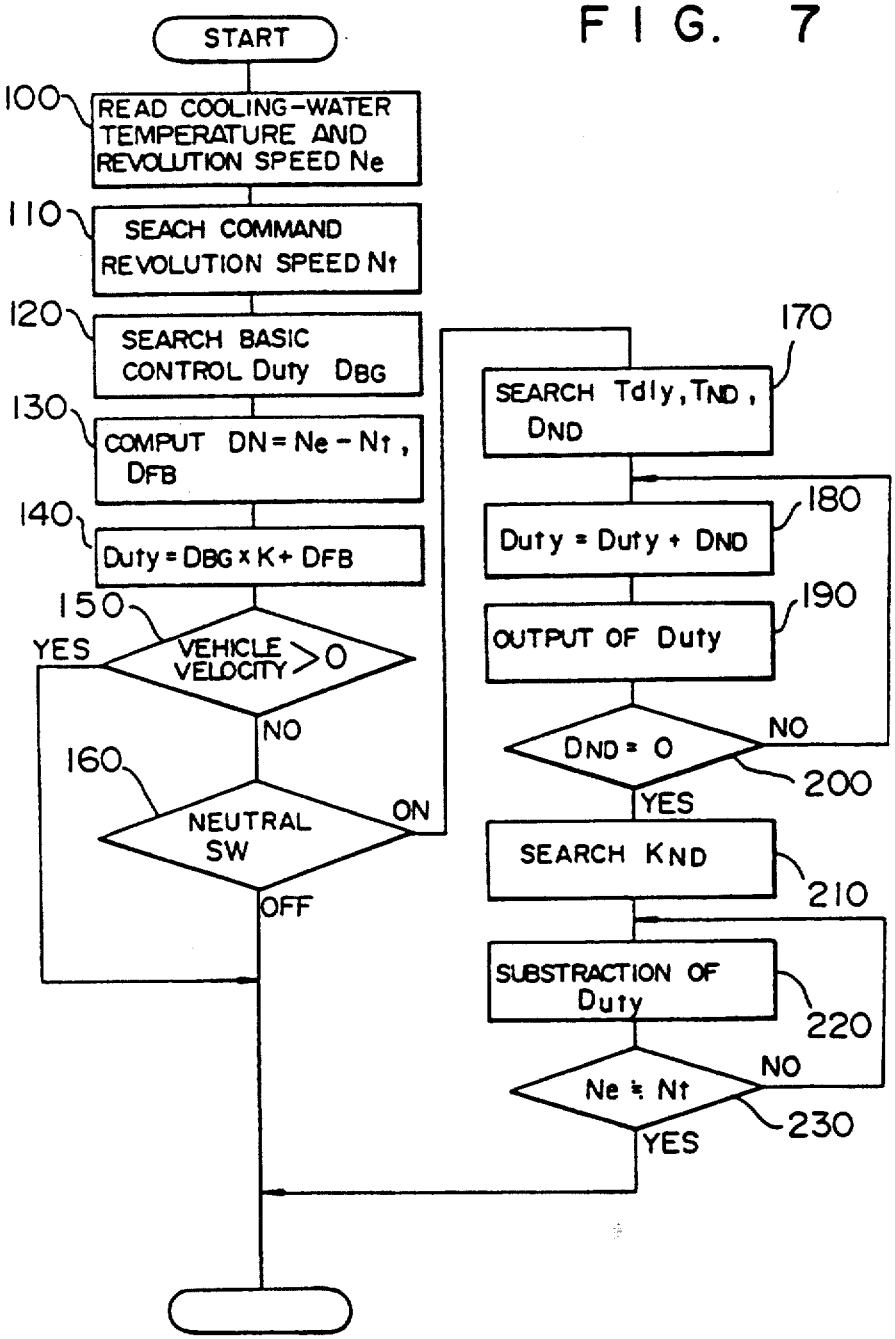
FIG. 7 is a flow chart illustrating the control method in accordance with the present invention.

Referring to FIG. 7, the engine cooling water temperature and the engine revolution speed are read in Step 100. In Step 110, the command speed corresponding to the cooling water temperature is searched through the table and, in Step 102, the basic control Duty $D_{BG}$ for attaining the command speed is searched through the table. In Step 130, a computation is conducted to determine the offset ΔN of the actual engine revolution speed from the command engine revolution speed and the feedback component $D_{FB}$ corresponding to the offset ΔN is computed. Using the computed value, a computation is conducted in Step 140 for determining the control Duty for the solenoid valve 48 of the auxiliary air control valve 47 (see FIG. 1).

In Steps 150 and 160, judgment is executed as to whether the vehicle or the automobile is running, i.e., whether there is a definite value of the vehicle velocity, and a judgment is conducted as to whether the neutral switch SW is ON or OFF, in order to determine whether the automatic transmission is set in the N range or another range such as the D range or the R range. When the neutral switch SW is in ON state while there is no value representing the vehicle velocity, it is judged that the shifting has been done form the N range to the D range or the R range, and the process proceeds to Step 170. In Step 170, the microprocessor searches through the water temperature table of FIG. 6 for the delay time Tdly, step increment Duty, $D_{ND}$ and the increment time $T_{ND}$ which are shown in FIG. 5, and, in Step 180, adds these values to the Duty which was computed before in Step 140, whereby a corrected control Duty is obtained. This Duty is delivered in Step 190 to the solenoid valve 48 through an output processing circuit. Furthermore, in Step 200, the expiration of the increment time $T_{ND}$ is judged by the counter and then the process proceeds to Step 210 in which the rate $K_{ND}$ of reduction in the Duty is searched and subtraction of Duty is executed in Step 220. In Step 230, a judgment is executed as to whether the offset of the actual revolution speed from the command revolution speed is the value which is to be fed back and then the process returns to the main routine, whereby the program of FIG. 7 is completed.

According to the present invention, when the intake air flow rate demanded by the engine is changed due to momentary change of the load in the transient period of shifting from the N range to the D range or to the R range, the control duty of the auxiliary air control valve is temporarily incremented in response to the shift signal, whereby a smooth driveability is attained without any reduction in the engine speed or engine stall when the automatic transmission is operated from the N range to the D or the R range.

What is claimed is:

1. A method of controlling revolution speed of an engine for use in an automobile having an automatic transmission through which driving power is transmitted from an engine to driving wheels, said method employing an engine revolution speed controlling apparatus which includes, at least, an auxiliary air control valve for supplying auxiliary air by-passing a throttle valve, electromagnetic means for actuating said auxiliary air control valve, a sensor for detecting the revolution speed of said engine, and control means for controlling the flow rate of said auxiliary air through said auxiliary air control valve by [varying the duty] *control* of said electromagnetic means in accordance with a signal from said sensor, said method comprising the steps of:

(a) effecting an increment of said [duty] *control* of said electromagnetic means after a time (Tdly) upon receipt of a signal representing that the state of said transmission has been changed from the neutral state to a power transmitting state;

(b) maintaining the incremented state of [duty] *control* for a period ($T_{ND}$);

(c) reducing the duty at a rate ($K_{ND}$); and (d) delivering the delay time (Tdly), period ($T_{ND}$) and the rate ($K_{ND}$) as functions of the cooling water temperature on the basis of the temperature of the engine cooling water.

2. An apparatus for controlling revolution speed of an engine, for use in an automobile having an automatic transmission through which driving power is transmitted from an engine to driving wheels, said apparatus having, at least, an auxiliary air control valve for supplying auxiliary air by-passing a throttle valve, electromagnetic means for actuating said auxiliary air control valve, a sensor for detecting the speed of said engine, and auxiliary air flow rate control means for controlling the flow rate of said auxiliary air through said auxiliary air control valve by varying the duty of said electromagnetic means in accordance with a signal from said sensor, said apparatus comprising:

shift detection means for detecting the shifting of operation range in said automatic transmission from neutral range to a power transmitting range;

temperature detecting means for detecting the engine cooling water temperature; and controlling means for effecting an increment of the [Duty] *duty* of said electromagnetic means after a delay (Tdly) upon receipt of a signal from said shift detection means indicative of the shift from the neutral range to the power transmitting range;

said controlling means including means for maintaining the incremented duty for a predetermined period ($T_{ND}$) reducing the duty at a reducing rate ($K_{ND}$), and computing means for computing the values of the delay time (Tdly), period ($T_{ND}$) and the reduction rate ($K_{ND}$) on the basis of the temperature of engine cooling water, in accordance with a predetermined program.

*3. A method of controlling revolution speed of an engine for use in an automobile having an automatic transmission through which driving power is transmitted from the engine to driving wheels of the automobile, said method comprising the steps of:*

*(a) supplying auxiliary air by-passing a throttle valve through an auxiliary air control valve;*

*(b) actuating said auxiliary air control valve using electromagnetic means;*

*(c) detecting the revolution speed of the engine;*

*(d) controlling the flow rate of said auxiliary air through said auxiliary air control valve by control of said electromagnetic means in accordance with the detected revolution speed of the engine; and*

*(e) effecting an incrementing of a level of control of said electromagnetic means after a delay time (Tdly) upon receive of a signal representing that the state of said transmission has been changed from the neutral state to a power transmitting state.*

*4. A method according to claim 3, further including the step of:*

*(f) varying said delay time (Tdly) as a function of the cooling water temperature of the engine cooling water.*

*5. A method according to claim 3, further including the steps of:*

*(f) maintaining the incremented level of control for a period ($T_{ND}$); and thereafter*

*(g) reducing the level of control at a rate ($K_{ND}$).*

*6. A method according to claim 5, further including the step of:*

*(h) varying at least one of said delay time (Tdly), said period ($T_{ND}$) and said rate ($K_{ND}$) as a function of the cooling water temperature of the engine cooling water.*

*7. An apparatus for controlling revolution speed of an engine for use in an automobile having an automatic transmission through which driving power is transmitted from said engine to driving wheels of the automobile, said apparatus comprising an auxiliary air control valve for supplying auxiliary air by-passing a throttle valve; electromagnetic means for actuating said auxiliary air control valve; a sensor for detecting the speed of said engine; auxiliary air flow rate control means for controlling the flow rate of said auxiliary air through said auxiliary air control valve by varying the level of control of said electromagnetic means in accordance with a signal from said sensor; shift detection means for detecting of said automatic transmission from neutral to a power transmission position; and controlling means for incrementing the level of control of said electromagnetic means after a delay time (Tdly) after receipt of a signal from said shift detection means indicative of the shift from neutral to the power transmitting range.*

*8. An apparatus according to claim 7, further including temperature detecting means for detecting engine cooling water temperature, said controlling means including means for varying said delay time (Tdly) as a function of the cooling water temperature.*

* * * * *